H. J. HICK.
FILING APPLIANCE.
APPLICATION FILED APR. 21, 1915.
1,194,382.
Patented Aug. 15, 1916.
2 SHEETS—SHEET 1.
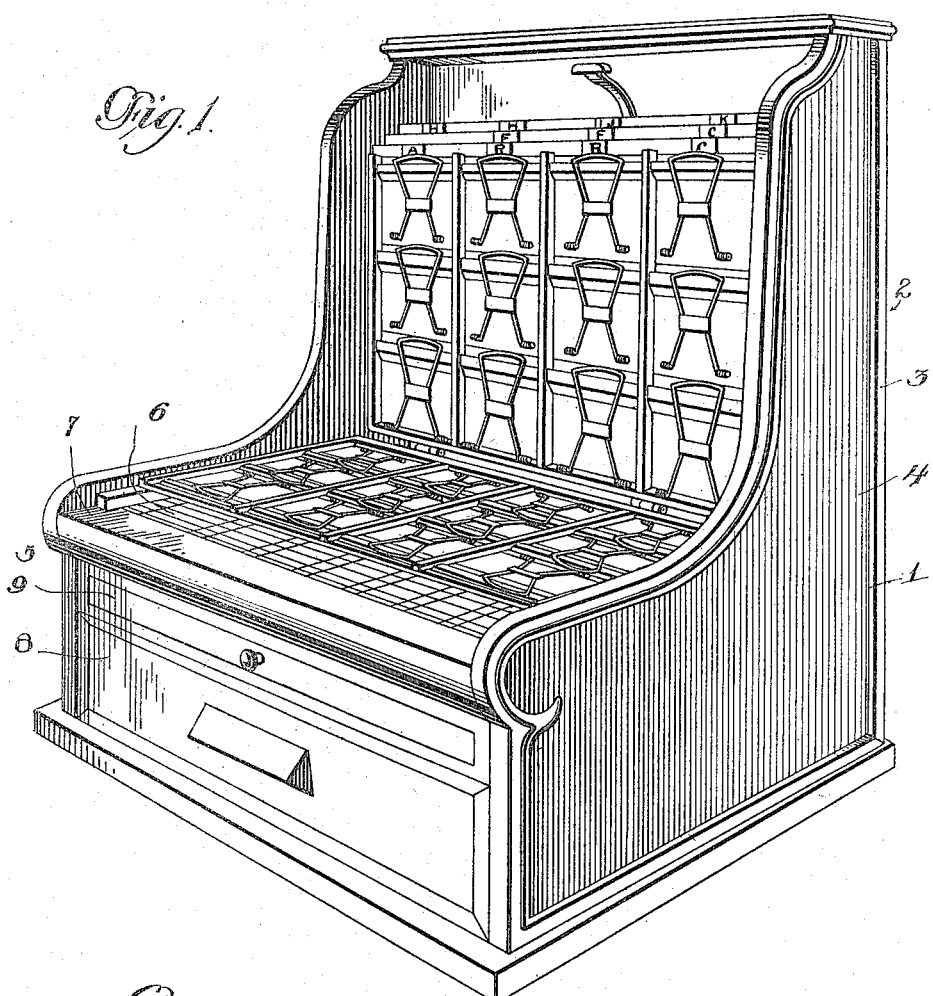
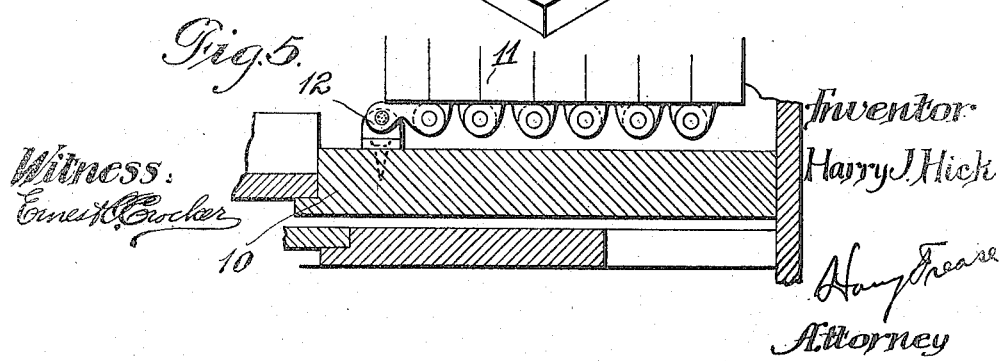

H. J. HICK.
FILING APPLIANCE.
APPLICATION FILED APR. 21, 1915.

1,194,382.

Patented Aug. 15, 1916.
2 SHEETS—SHEET 2.

Witness
Ernest O. Crocker

Inventor:
Harry J. Hick
By
Attorney

UNITED STATES PATENT OFFICE.

HARRY J. HICK, OF ALLIANCE, OHIO, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,194,382.     Specification of Letters Patent.     Patented Aug. 15, 1916.

Original application filed December 11, 1912, Serial No. 736,176. Divided and this application filed April 21, 1915. Serial No. 22,747.

*To all whom it may concern:*

Be it known that I, HARRY J. HICK, a citizen of the United States, residing at Alliance, in the county of Stark and State of Ohio, have invented certain new and useful Improvements in Filing Appliances, of which the following is a specification.

The invention relates to an appliance for filing, holding and keeping papers or documents in serial or classified arrangement, and particularly to that class of such appliances which includes a series of normally upright hinged leaves adapted to be swung from upright to reclined position and vice versa of the type set forth in my application, Serial No. 736,176, filed December 11, 1912, of which this application is a division; and the object of the invention is to provide means for facilitating the removal of a slip or slips from behind a series of spring clips mounted on said leaves. This and other objects may be attained by the construction and arrangement illustrated in the accompanying drawings forming part hereof, in which—

Figure 4:
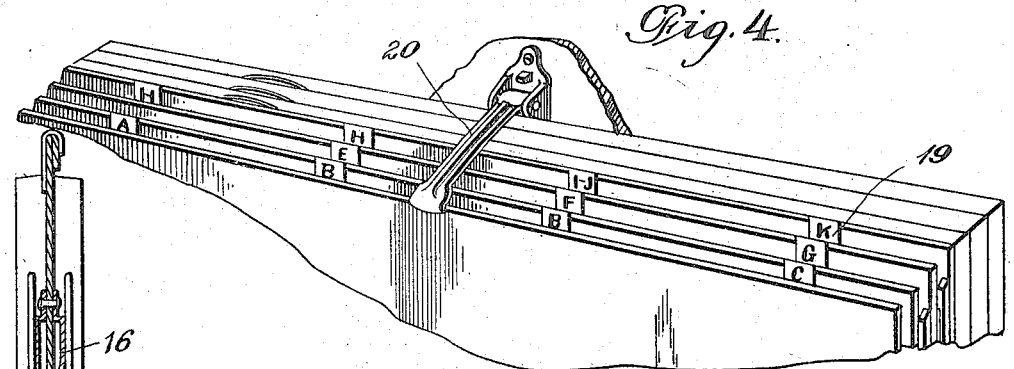
Figures 2, 3:
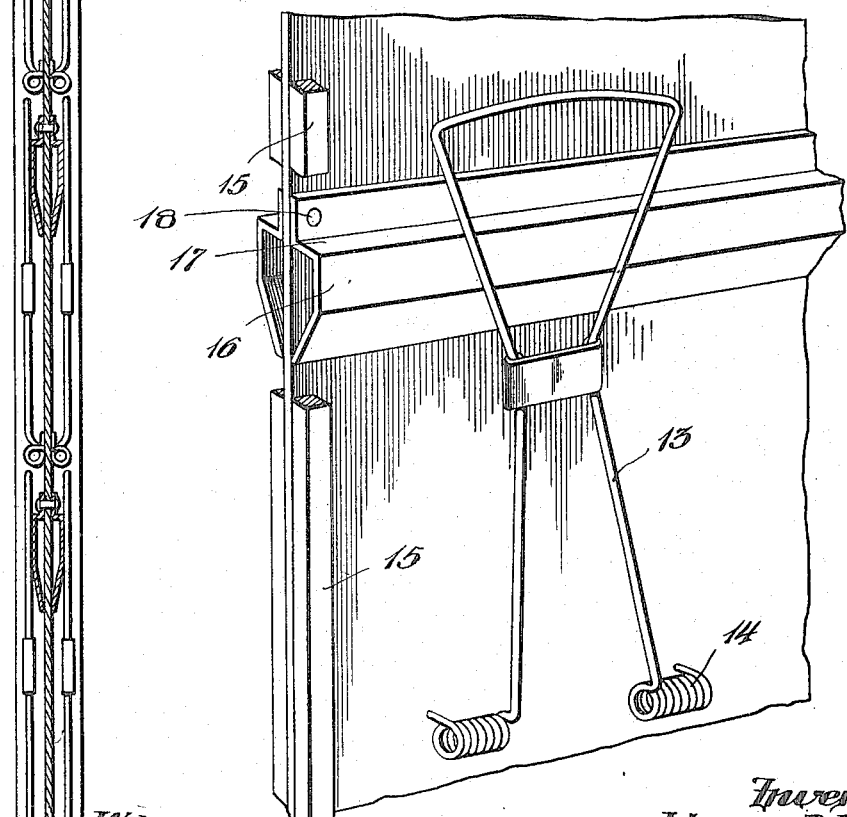

Figure 1 is a perspective view of a filing appliance embodying my invention, the front leaf of the series of leaves being reclined; Fig. 2, a fragmentary view in perspective of a leaf having shoulders or ribs arranged on opposite faces of the leaves; Fig. 3, a sectional view of one of the leaves; Fig. 4, a fragmentary view of the upper portion of the leaves when in normal vertical position; and Fig. 5, a fragmentary view of a portion of the casing and leaves, when the latter are in normal position.

In the drawings 1 indicates a casing or housing of any usual or preferred construction, preferably comprising an upright portion 2 having a back 3 and side pieces 4. The casing is provided with a desk portion 5 having a transparent top 6, an index carrying slide 7 and drawers 8 and 9, the latter being adapted to receive and store blanks, pads, pad holders, pencils or other supplies and articles for use in carrying out the system, if desired.

10 indicates a support, preferably arranged on a level with or slightly above the desk top 6, the foremost one of a series of holders 11 hinged together at their lower ends being pivotally mounted on said support as at 12; whereby when one or more of the leaves are reclined, the lower edges of all the remaining upright leaves move forward to the position occupied by the lower edge of the last leaf reclined.

13 indicates a series of bill holding spring operated clips, mounted upon one or both sides of each leaf, as desired, each of said clips being preferably formed from resilient wire and having coils 14 at their opposite free ends to form springs for normally pressing the clip toward the adjacent face of the leaf, the free ends of the wire being suitably secured to the leaf. It will be understood that any suitable bill holding clip or clamp may be used, but preferably they are skeleton in form in order that the memoranda or the slips of paper filed behind them can be easily read.

15 indicates a plurality of spacing strips extending longitudinally of each leaf and parallel to each other, which strips operate to strengthen the leaves, as well as to space them apart, and to form side walls for each slip filing section.

Means are provided on the opposite face of each leaf near the free end of each of the clips 13 to facilitate the removal of one or more slips from beneath each of said clips, said means preferably comprising a thin metallic plate 16 bent longitudinally, as shown in the sectional view in Fig. 3, to form a shoulder 17 thereon and horizontally arranged near the free ends of the adjacent clips 13. Said plates may be secured to the leaf in any well known manner, as by means of rivets 18, the plates on opposite sides of the leaf preferably being arranged directly opposite each other so that they may be secured to the leaf by means of rivets extending therethrough and connecting them together. By this construction it will be evident that when it is desired to remove one or more of the slips which are being retained in position on the leaf by the spring clip, the upper edges of such slips may be folded back over the shoulder 17 and readily grasped by the hand of the operator.

For convenience in operation, I preferably arrange the upper edges of the leaves 10 in echelon, so that the index devices 19 may be readily seen, a retaining device 20 being pivoted to the back 3, and provided with a latch 21 at or near its free end adapted to engage the upper end of the foremost leaf and hold all the leaves closed when the leaves are in normal position. When the upper edges of some of the leaves are arranged in the same horizontal plane, one behind the other, and the other leaves of the series are arranged in echelon, as shown in Fig. 4, the guiding device 20 is bent so that it will lie adjacent to the upper edges of all the leaves.

To those skilled in the art of making apparatus of the class described, many alterations and widely differing embodiments and applications of my invention will suggest themselves, my disclosures and description herein being purely illustrative and not intended to be in any sense limiting.

I claim:

1. In a filing appliance, the combination of a leaf provided with a series of clips for removably holding papers or slips on said leaf, and a rib arranged beneath the slips held by each clip and between the clip and the leaf, and forming a shoulder over which the slips are folded.

2. In a filing appliance, the combination of a leaf provided with a series of clips for removably holding papers or slips on said leaf, and a rib extending parallel to and arranged beneath the slips held by each clip near the upper end thereof and forming a shoulder over which the slips are pressed to facilitate their insertion and removal.

3. In a filing appliance the combination of a leaf or frame, a clip for supporting papers on one face of said leaf or frame, and a device carried by said leaf or frame extending transversely of and arranged beneath the slip or slips held by the clip near the upper end thereof, whereby the slip or slips can be pressed backwardly.

4. In a filing appliance, the combination of a leaf, a plurality of clips mounted thereon, and a plate carried by the leaf at or near the free end of said clips and bent longitudinally to form a shoulder or rib to facilitate the filing and removal of the records from behind each of said clips.

HARRY J. HICK.

Copies of this patent may be obtained for five cents each, by addressing the "Commissioner of Patents. Washington, D. C."